July 10, 1962  W. J. RUFFING  3,043,027
SNOW SCOOPER
Filed Jan. 13, 1959  2 Sheets-Sheet 1
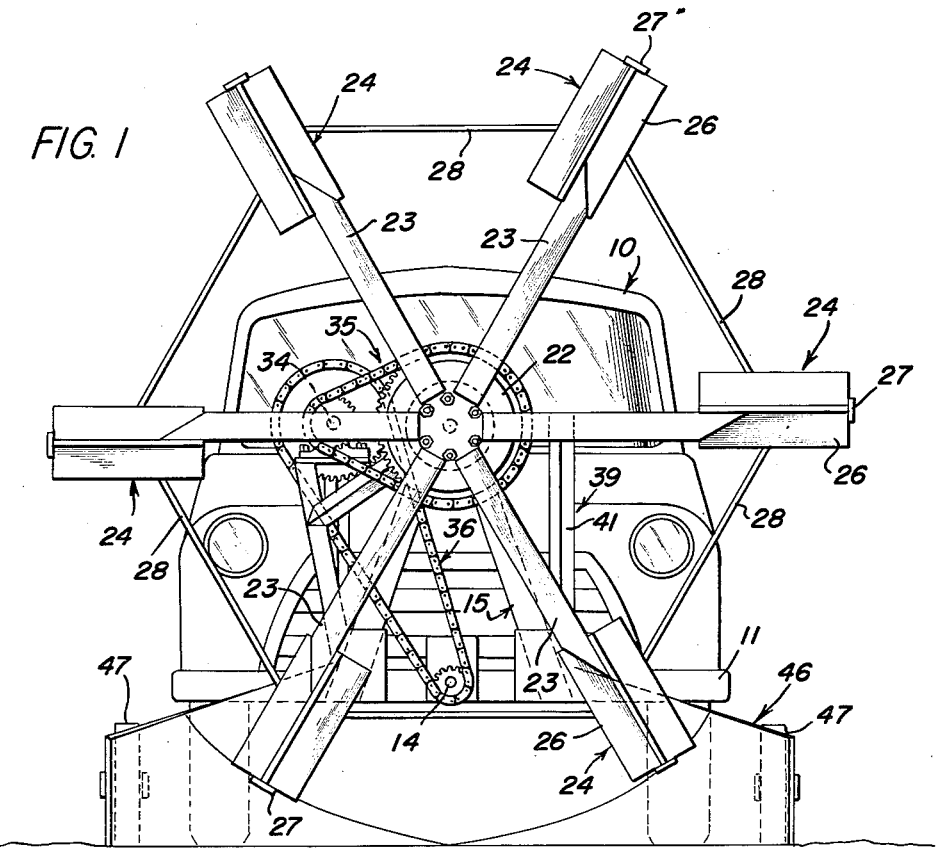
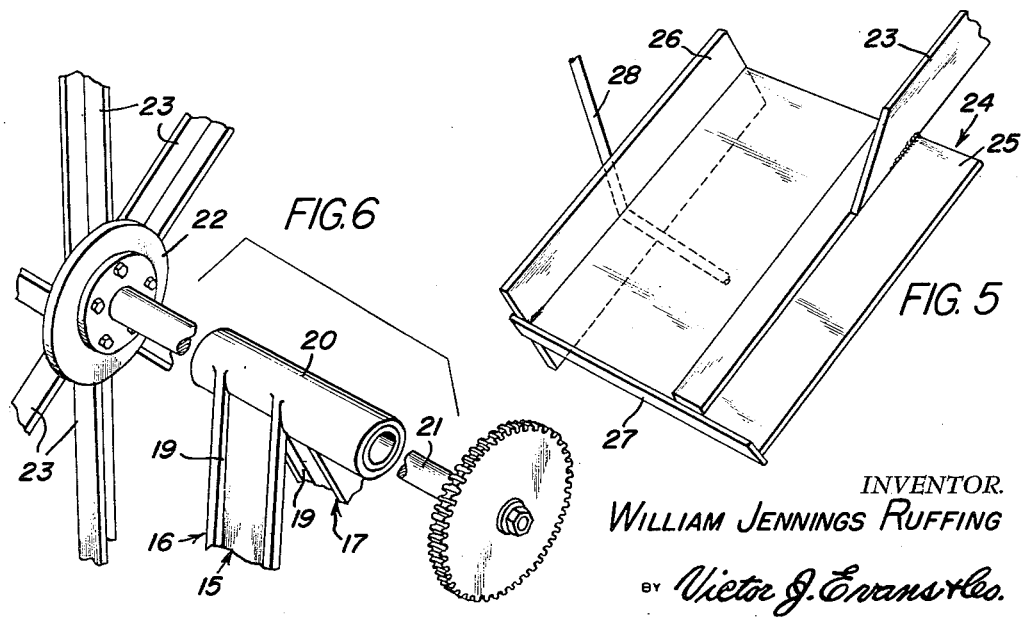
INVENTOR.
WILLIAM JENNINGS RUFFING
BY *Victor J. Evans & Co.*
ATTORNEYS July 10, 1962 W. J. RUFFING 3,043,027
SNOW SCOOPER
Filed Jan. 13, 1959 2 Sheets-Sheet 2
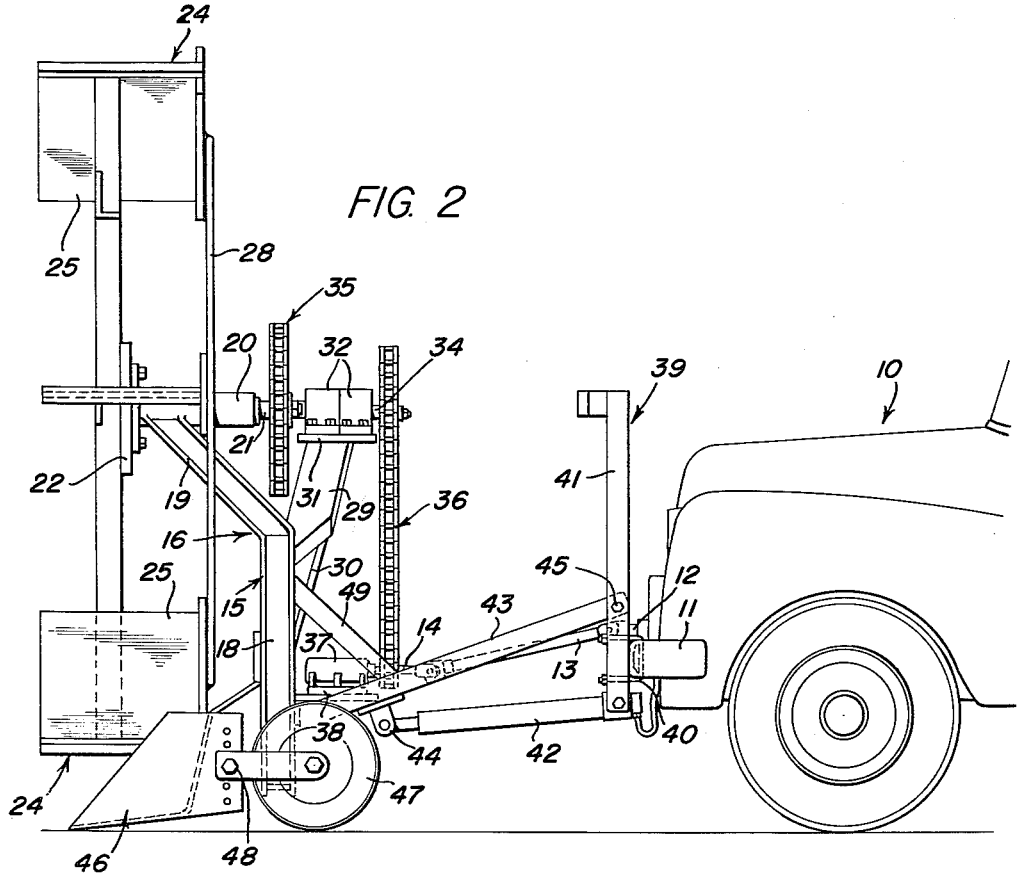
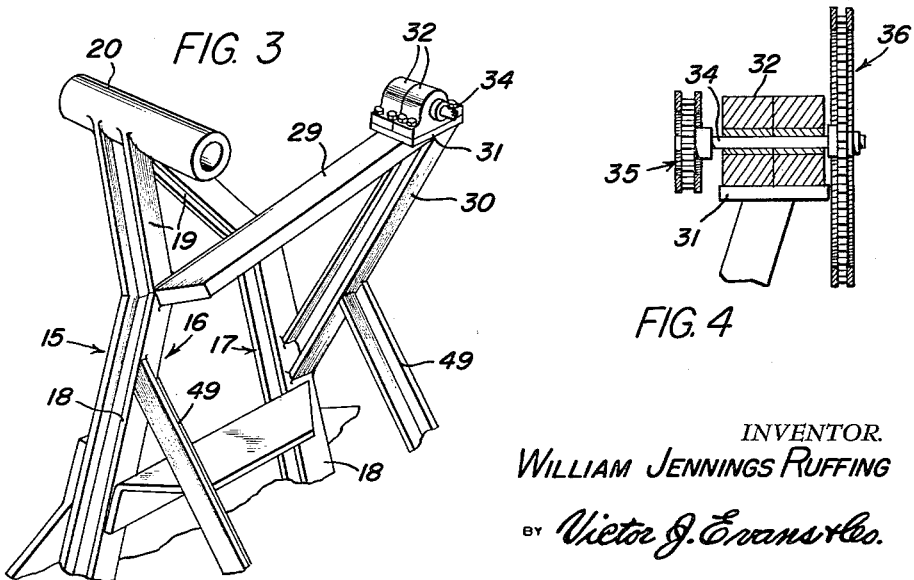
INVENTOR.
WILLIAM JENNINGS RUFFING
BY *Victor J. Evans & Co.*
ATTORNEYS United States Patent Office 3,043,027
Patented July 10, 1962

3,043,027
SNOW SCOOPER
William Jennings Ruffing, Lusk, Wyo.
Filed Jan. 13, 1959, Ser. No. 786,545
7 Claims. (Cl. 37—43)

This invention relates to a snow shovel or scooper.

The object of the invention is to provide a machine which is adapted to be used for effectively removing snow from highways, roads or the like.

Another object of the invention is to provide a snow shovel or snow removal apparatus which consists of a plurality of scoopers that are mounted contiguous to the front of a vehicle such as a truck whereby snow can be readily cleaned or removed from any desired area or locality.

A further object of the invention is to provide a snow scooper which is extremely simple and inexpensive to manufacture.

Other objects and advantages will be apparent during the course of the following description.

In the accompanying drawings, forming a part of this application, and in which like numerals are used to designate like parts throughout the same, FIGURE 1 is a front elevational view illustrating the snow scooper of the present invention.

FIGURE 2 is a side elevational view of the snow scooper.

FIGURE 3 is a fragmentary perspective view illustrating certain constructional details of the apparatus.

FIGURE 4 is a fragmentary sectional view showing one of the shafts and its supporting arrangement.

FIGURE 5 is a perspective view illustrating one of the movable scoopers.

FIGURE 6 is a fragmentary perspective view showing certain constructional details.

Referring in detail to the drawings, the numeral 10 indicates a portion of a vehicle such as a truck which includes a front bumper 11 and a power take-off 12. The numeral 13 indicates a first shaft which is coupled to the power take-off 12, and a second shaft 14 is coupled to the first shaft 13.

The numeral 15 indicates a frame which is arranged forwardly of the truck 10, and the frame 15 includes beams 16 and 17. These beams include lower first portions 18 and upper portions 19, and the upper portions 19 meet at a common apex as shown in FIGURE 3 and have a bearing or sleeve 20 secured thereto as by welding.

The numeral 21 indicates a third shaft which extends through the sleeve 20, FIGURE 6, and a disc 22 is secured to the front end of the shaft 21. There is further provided a plurality of radially disposed arms 23 which are secured to the disc 22, and a scooper 24 is secured as by welding to the outer end of each arm 23. As shown in FIGURE 5 each scooper 24 includes a main body portion 25 as well as a flange 26 and a transverse lip 27. Reinforcing rods 28 serve to interconnect the scoopers 24 so as to maintain the parts in their proper alined position.

There is further provided support members 29 and 30 which are secured to the beams 16 and 17 in any suitable manner, as for example by welding, FIGURE 3, and the members 29 and 30 serve to support a base 31 on which is mounted bearings 32, and a fourth shaft 34 extends through the bearings 32. The numeral 35 indicates a chain and sprocket mechanism which serves to connect the shafts 21 and 34 together. There is also provided a chain and sprocket mechanism 36 which serves to connect the shafts 14 and 34 together.

The shaft 14 is supported by a bearing 37 which is mounted on a base 38, as for example as shown in FIGURE 2.

There is further provided a supporting structure which is indicated generally by the numeral 39, and the supporting structure 39 is arranged contiguous to the front of the truck 10 and is positioned rearwardly of the frame 15. The supporting structure 39 is clamped or connected to the front bumper 11 of the truck 10 as for example by means of the bolts or clamps 40. The supporting structure 39 includes a pair of spaced parallel vertically disposed posts or uprights 41. The numeral 42 indicates a hydraulic cylinder or ram which is adapted to be connected to a suitable source of hydraulic fluid under pressure, and the cylinder 42 is connected to a pair of braces 43 by means of a connection 44. The rear ends of the braces 43 are pivotally connected to the posts 41 by means of pivot pins or bolts 45, while the front ends of the braces 43 are secured as by welding to the frame 15. Thus, by properly actuating the cylinder or ram 42, the frame 15 and its associated parts can be effectively raised or lowered as desired.

The numeral 46 indicates a blade which is supported adjacent the lower front portion of the frame 15 and which is secured to the frame in any suitable manner. There is further provided a pair of wheels 47 which are arranged rearwardly of the blade 46, and the wheels 47 may be supported by means of straps 48.

From the foregoing, it is apparent that there has been provided a snow removal apparatus and in use, with the parts arranged as shown in the drawings it will be seen that as the truck 10 moves along the roadway or other area to be cleaned of snow, and with the power take-off 12 actuated, the shaft 13 will be rotated, and this in turn will cause rotation of the shaft 14. As the shaft 14 rotates, it moves or actuates the chain and sprocket mechanism 36 which in turn causes rotation of the shaft 34. As the shaft 34 rotates, it actuates the chain and sprocket mechanism 35 which causes rotation of the shaft 21. Since the shaft 21 has the disc 22 secured to its front end, and since the arms 23 are connected to the disc 22, it will be seen that this will cause rotation of the arms 23. Each of the arms 23 has a scooper 24 secured to its outer end, so that as the truck moves along the area to be cleaned a plurality of rotating scoopers 24 will scoop up or clear the snow from the path of the truck and this snow will be thrown off to the side. Reinforcing members 49 extend between the frame 15 and braces 43 as shown in the drawings.

Furthermore, it is to be noted that the blade 46 is arranged adjacent the lower portion of the frame 15, and the wheels 47 are positioned rearwardly of the blade 46. The blade 46 will help scoop up the snow or ice and the wheels 47 facilitate movement of the apparatus or machine along the road, highway or the like. By properly actuating the hydraulic cylinder 42, the frame 15 can be raised or lowered so that the elevation of the scoopers 24 as well as the height or position of the blade 46 can be raised or lowered as desired.

The parts can be made of any suitable material and in different shapes or sizes.

When the apparatus is not needed, the same can be readily detached from the truck 10 so that the truck can be used in the usual manner. The supporting structure 39 may be fastened to the front bumper in front of the truck 10 in any suitable manner, as for example by means of U-bolts 40.

The machine of the present invention uses an entirely novel and unique system of snow removal and the machine of the present invention will clear its own path without the necessity of using augers, beaters or the like and nothing is arranged in front of the scooper blade 46.

It is to be understood that the size and shape of the scoopers can be varied as desired and different numbers of scoopers can be used as required or desired. The important aspect of the present invention is the concept of an unshrouded scooper wheel which removes all the snow and turns at a low speed such as from 50 to 100 revolutions per minute.

Thus, the snow plow operates at relatively slow speed and the scoopers may be arranged to turn in either a right or left direction and the snow will be scooped off of the highway or other surface and deposited to either side thereof. The blade 46 keeps the snow pushed up from behind so as to make a clean trail. The device does not have a shroud and this is very important in reducing the power requirement.

The scooper wheel is down close to the ground and is ahead of everything else and it has no auger and turns at a relatively slow speed such as from 50 to 60 to 100 r.p.m. It requires a very small amount of power to do a heavy snow removal job, and heavy objects such as tree limbs, small rocks, chunks of ice and the like do not interfere with the slow speed scooper wheel of the present invention. The present invention has a scooping effect since the wheel turns quite slowly and the wheel itself cuts the entire width of the swath.

The snow scooper completely clears its own trail and the snow scooper of the present invention is adapted to be mounted on present equipment such as a tractor or truck and the wheel scoops the snow from the underside and removes it without blowing and this alone makes a tremendous amount of difference in the power requirements.

A high speed wheel cannot stand the impact of ice, rocks or limbs or the like and the present invention can be operated without causing any damage to the parts.

The rotating scooper wheel turns at a very slow speed, and does all of the snow removal, except for the clean-up blade 46 which cleans up the corners and backside, and the scooper blade itself is ahead of all other parts. There is no other moving part except the gear reduction, sprockets and chains, and the present invention is made to go ahead and open drifts which are impassable and this is done by removing deep snow and throwing it to either side by reversing the direction of rotation.

Thus, an important advantage of the present invention is that it removes the snow without getting to a high speed storm or blizzard form and it removes the snow with a very small amount of power compared to high speed types of blowers or fans. This fan or blowing operation is not necessary and it requires so much power that in bigger jobs an auxiliary motor is used. In the present invention an auxiliary motor is not required, but in certain installations such an auxiliary motor or power source may be used.

Furthermore, the snow removal equipment of the present invention can be made at a very low cost and the job can be done quickly and efficiently.

Minor changes in shape, size and rearrangement of details coming within the field of invention claimed may be resorted to in actual practice, if desired.

I claim:

1. In a snow removal apparatus, a vehicle including a forwardly arranged power take-off and a front bumper, a first shaft coupled to said power take-off, a second shaft coupled to said first shaft, a frame arranged forwardly of the vehicle and including spaced apart beams embodying lower first portions and upper second portions, said upper portions meeting at a common apex, a hollow sleeve secured to said upper portions at the apex thereof, a third shaft extending through said sleeve, a disc secured to the front end of said third shaft, a plurality of radially disposed arms secured to said disc, scoopers secured to the outer ends of said arms, support members secured to said frame, a fourth shaft supported by said support members, chain and sprocket means connecting said third and fourth shafts together, chain and sprocket means connecting said second and third shafts together, a supporting structure clamped to the vehicle front bumper and including spaced parallel vertically disposed posts, braces having their rear ends pivotally connected to said posts and their front ends secured to said frame, a hydraulic cylinder for raising and lowering the frame, a blade supported adjacent the lower front portion of the frame, and wheels mounted rearwardly of the blade, the area radially outwardly of the path of movement of the scoopers being completely free of obstructions except for said blade.

2. The structure as defined in claim 1, wherein each of said scoopers includes a flat main body portion disposed parallel to a radial plane from the center of the disc, a flange and lip contiguous to said main body portion, and reinforcing members connecting the scoopers together.

3. In a snow removal device, a first shaft adapted to be connected to a power source, a second shaft coupled to said first shaft, a forwardly disposed frame including spaced apart beams embodying lower first portions and upper second portions, said upper portions meeting at a common apex, a hollow sleeve secured to said upper portions at the apex thereof, a third shaft extending through said sleeve, a disc secured to the front end of said third shaft, a plurality of radially disposed arms secured to said disc, scoopers secured to the outer ends of said arms, support members secured to said frame, a fourth shaft supported by said support members, chain and sprocket means connecting said third and fourth shafts together, chain and sprocket means connecting said second and third shafts together, a supporting structure positioned rearwardly of the frame and including rearwardly disposed posts, braces having their rear ends pivotally connected to said posts and their front ends secured to said frame, a blade supported adjacent the lower front portion of the frame, and wheels mounted rearwardly of the blade, the area radially outwardly of the path of movement of the scoopers being completely free of obstructions except for said blade.

4. A device for removing snow and for use with a vehicle having a forwardly projecting power take-off and a framework, said device comprising a supporting frame adapted to be attached to the framework of the vehicle for movement in a vertical plane, ground engaging wheels carried by the frame for changing the elevation of the frame in response to variations in the surface traversed, a forward extending snow gathering blade carried by said frame, said blade being disposed forwardly of said wheels, an enlarged snow scooping wheel rotatably mounted on said frame and disposed forward thereof with the entire periphery of the scooping wheel above said blade being free of obstructions, speed reduction means connected to said scooping wheel and adapted to be driven by said power take-off for driving the scooping wheel at relatively slow speed to prevent damage thereto in the event of engagement with ice, rocks or the like, said scooping wheel including a plurality of circumferentially spaced radial arms, each arm having a scoop on the outer end thereof including a flat paddle-like main body disposed perpendicular to the path of movement of the arm for scooping snow from above and in front of the blade and discharging the snow without obstruction in a radial direction above the blade, a reinforcing rod interconnecting the adjacent arms adjacent the outer ends thereof for maintaining the arms in circumferentially spaced relation, each main body including a laterally extending flange on the outer end thereof of relatively shallow depths for temporarily retaining the snow thereon until it passes above the blade for discharge laterally.

5. The structure as defined in claim 4 wherein said blade includes forwardly extending side areas with inwardly curved rear areas for gathering the snow, said scoops moving in front of the rear area for removing the snow from in front of the blade thereby leaving a clean trail.

6. The structure defined in claim 5 wherein each main body includes a laterally extending flange on the rear edge thereof for preventing snow from passing rearwardly of the paddles, said reinforcing rods being connected with the flanges on the rear edge of the paddles.

7. The structure defined in claim 6 together with means adjustably supporting said blade from the frame for varying the elevational position of the blade in relation to the ground surface and varying the position of the blade in relation to the scooping wheel whereby the snow removal characteristics of the device may be varied.

References Cited in the file of this patent

UNITED STATES PATENTS

| | | |
|---|---|---|
| 328,993 | Witt | Oct. 27, 1885 |
| 1,482,048 | Stephenson | Jan. 29, 1924 |
| 1,849,296 | Holmes | Mar. 15, 1932 |
| 1,977,871 | Christopherson | Oct. 23, 1934 |
| 2,198,407 | De Brun | Apr. 23, 1940 |
| 2,269,326 | Wandscheer | Jan. 6, 1942 |
| 2,283,101 | Snook | May 12, 1942 |
| 2,779,112 | Garland | Jan. 29, 1957 |

FOREIGN PATENTS

| | | |
|---|---|---|
| 1,080,112 | France | May 26, 1954 |